United States Patent [19]

Levenson

[11] Patent Number: 5,161,133
[45] Date of Patent: Nov. 3, 1992

[54] MAGNETO-OPTICAL STORAGE SYSTEM

[75] Inventor: Marc D. Levenson, Saratoga, Calif.

[73] Assignee: International Business Machines Corporation, Armonk, N.Y.

[21] Appl. No.: 722,373

[22] Filed: Jun. 25, 1991

Related U.S. Application Data

[63] Continuation of Ser. No. 414,868, Sep. 29, 1989, abandoned.

[51] Int. Cl.⁵ .......................... H04B 1/20; G11B 5/02; G11B 7/00; G11B 21/10
[52] U.S. Cl. ........................................ 369/13; 360/59; 369/44.42; 369/110; 369/112
[58] Field of Search .................... 360/59, 114; 369/13, 369/112, 110, 120, 44.42

[56] References Cited

U.S. PATENT DOCUMENTS

| | | | |
|---|---|---|---|
| 3,736,046 | 5/1973 | Zook | 360/59 X |
| 3,992,575 | 11/1976 | Valzel et al. | 178/6.6 |
| 4,059,841 | 11/1977 | Bricot et al. | 358/128 |
| 4,065,786 | 12/1977 | Stewart | 358/128 |
| 4,525,828 | 6/1985 | Higashiyama et al. | 369/13 |
| 4,702,603 | 10/1987 | Augustyn | 350/394 |
| 4,794,585 | 12/1988 | Lee | 369/112 |
| 4,894,815 | 1/1990 | Yamanaka | 360/114 |
| 4,926,403 | 5/1990 | Tsuyuguchi et al. | 360/114 X |
| 4,939,710 | 7/1990 | Fuji et al. | 369/13 |
| 4,945,529 | 7/1990 | Ono et al. | 369/110 |
| 4,953,124 | 8/1990 | Koyama | 369/110 |

FOREIGN PATENT DOCUMENTS 59-79446 5/1984 Japan.

Primary Examiner—Eugene R. Laroche
Assistant Examiner—Christopher Glembocki
Attorney, Agent, or Firm—Otto Schmid, Jr.; Douglas R. Millett

[57] ABSTRACT

A magneto-optical (M-O) storage detection channel which includes optical means for detecting edge transitions between magneto-optical domains. The beam returning from the storage medium is analyzed both spatially and in polarization. When a transition is centered under the read laser beam, the spatial reversal in the sign of the amplitude of the signal polarization due to the spatially nonuniform Kerr rotation is compensated by a reversal due to spatially nonuniform (split) detectors or a matched optical filter. The optical powers on the two sides of each split detectors or on two independent detectors sensitive to orthogonal polarizations become unequal thereby producing an electrical signal signal which comprises spaced peaks in opposite directions at the leading and trailing edges of the M-O domain or mark.

24 Claims, 3 Drawing Sheets

MAGNETO-OPTICAL STORAGE SYSTEM

This is a continuation of copending application Ser. No. 07/414,868 filed on Sep. 29, 1989, now abandoned.

BACKGROUND OF THE INVENTION

This invention relates to optical storage, and more particularly to a detection system for magneto-optical storage.

DESCRIPTION OF THE PRIOR ART

Optical recording systems have come into use in recent years because of their potential for high density recording. One approach for optical recording is magneto-optical recording in which a focussed laser beam is pulsed to high power for a short time to raise the temperature of a perpendicularly magnetized recording medium sufficiently for an externally applied magnetic field to reverse the direction of magnetization in the heated region. When the medium returns to a lower temperature for readout, the reverse-magnetized domain persists. Readout of information employs the polar Kerr effect. Linearly polarized light, reflected from a perpendicularly magnetized medium, is rotated to the left or right, according to the direction of the plane of polarization of the reflected light, magnetization direction along a recorded track can be read out by the same focussed laser beam that was used for recording information.

A detector system is provided to sense the magnetic transitions, and to provide focussing and tracking signals to maintain the laser spot in precise position relative to the disk surface and data tracks. In magneto-optical storage systems with Pulse Width Modulation (PWM), the location of one bits are encoded by the positions of transitions between up and down magnetic domains. In prior art systems, these transitions have been sensed electronically as a change in the difference between the currents produced by two light detectors.

For example, Japanese PUPA 59-79446 shows apparatus including two detectors each of which is sensitive to light oriented in one direction. This detection apparatus essentially discards one-half of the signal light.

U.S. Pat. No. 3,992,575 has apparatus for changing the optical path length so that three different lengths can be obtained for determining whether the read beam is properly focussed, and U.S. Pat. No. 4,065,786 discloses a push-pull tracking system which senses the detected signal and a tracking error signal which permits the beam to be maintained on track.

U.S. Pat. No. 4,059,841 discloses a non-magneto-optical system which utilizes four detectors and differential reading of the signal along the track. The detection signal is obtained by means of electronic circuits which add electrical noise. The signal-to-noise ratio imposes a limit on the minimum bit size that can be recorded so the added electrical noise directly impacts the recording density that can be achieved.

No prior art is known in which the edge of the magneto-optical domains are detected optically.

SUMMARY OF THE INVENTION

It is therefore the principal object of this invention to provide a magneto-optical storage detection system in which the edges of the magneto-optical domains are detected optically.

In accordance with the present invention, a magneto-optical storage detection system comprises a source of radiation, means for directing the source of radiation to a storage medium upon which marks are recorded, and means for directing the radiation reflected from the recorded mark to a detection channel. The detection channel comprises means for detecting the recorded data which is sensitive to the transitions between the domains of a first and a second magnetization state so that an electrical signal is produced in response to the detected transitions which is indicative of the recorded data.

In a specific embodiment, the means for detecting the recorded data comprises an optical matched filter in conjunction with a dual optical detector.

For a fuller understanding of the nature and advantages of the present invention reference should be made to the following detailed description taken in conjunction with the accompanying drawings.

DESCRIPTION OF THE PREFERRED EMBODIMENTS

Figure 1:
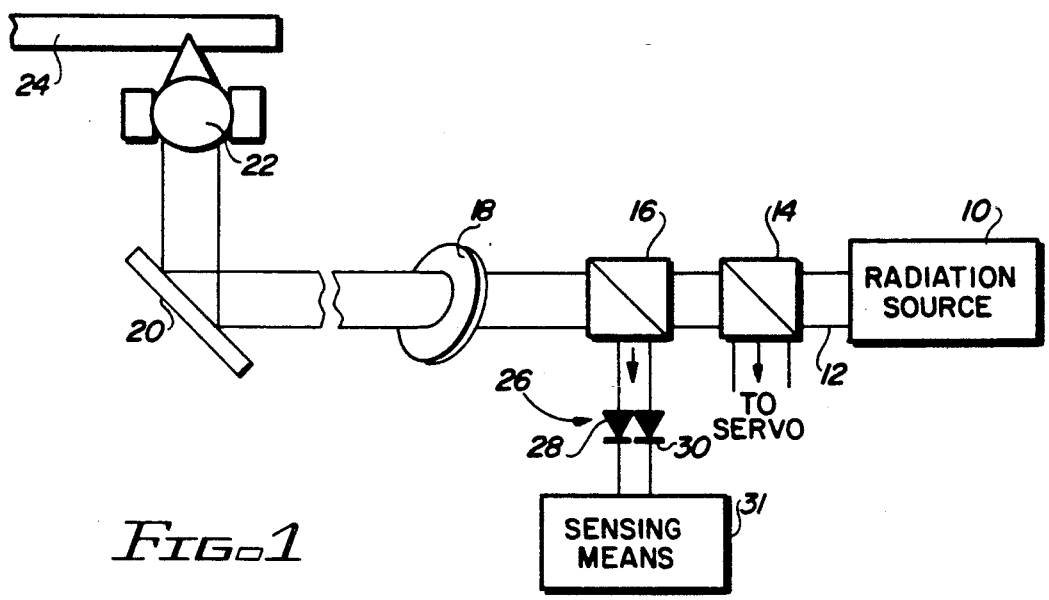
FIG. 1 schematically shows a magneto-optical storage detection system according to the present invention.

As shown in FIG. 1 of the drawings, the detector system for magneto-optical storage comprises a radiation source 10 which in a specific embodiment comprises a laser. The laser produces a collimated beam 12 which is directed through a 70% transmitting beam splitter 14 and a polarization analyzer 16. Polarization analyzer 16 reflects x polarized light and transmits y polarized light. The y polarized beam transmitted through the analyzer 16 is then incident on a birefringent compensator plate 18 which produces a small x polarized component out of phase with the y component. This x component acts as the phase shifted local oscillator necessary for far field edge detection according to the present invention.

In the embodiment shown in FIG. 1, the compensator plate 18 comprises a quarter wave plate oriented at an optimum angle with respect to both the x and y directions so that linearly polarized input light is made elliptically polarized. The beam is then directed by turning mirror 20 to objective lens 22 which focuses the beam to a selected location on magneto-optical recording disk 24. Items 20 through 24 are rotated 90 degrees for clarity in the drawing. The reflected light from a previously recorded signal is then guided to the detection system by the same optical components including the objective lens 22, turning mirror 20 and birefringent compensator plate 18. As the reflected beam passes through birefringent compensator plate 18, the beam is made more elliptically polarized. After propagating through the birefringent plate 18, the x polarized component is directed into the data detection beam line by the polarization analyzer 16. Part of the y polarized component is directed into the servo system (not shown) by beam splitter 14, and the rest returns to the laser. The x component is directed into the split photodetector 26. When no recorded transition is present on the selected location on recording disk 24, equal illumination is produced on both photodiodes 28 and 30 which make up split photodetector 26. When resulting signals are sensed differentially, no net signal results. However, when a recorded transition is present, the optical power is greater on one photodiode 28 than the other 30 and a detection signal is produced by sensing means 31.

Figure 2:
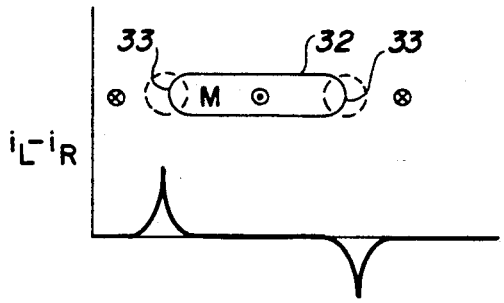
FIG. 2 shows the signal waveform which results from detection of a recorded transition according to the present invention.

FIG. 2 shows a typical signal produced by a reversal of magnetization along the track which shows marks recorded as domains of up and down magnetization to produce recorded domain 32 and in which two positions of the laser beam are shown as dashed circles. The light reflected by the recording medium can be decomposed into a local oscillator component along the direction of the incident laser, and a signal component in the orthogonal direction. The sign of this signal component changes at a transition. When a transition is located at the center of the laser spot, the power at the left detector 28 is different from the detector 30 on the right. In regions of uniform magnetization, both the left detector 28 and the right detector 30 have identical illumination. Thus, as the laser spot scans over the recorded transition 33, the difference in power leads to a difference in the photocurrents $i_L - i_R$ of the two sides of the detector which is produced by circuits within sensing means 31 and this difference varies as shown in FIG. 2. The operation of the detection system does not depend critically upon the method of producing the x component which acts as the phase shifted local oscillator necessary for far field edge detection.

Figure 3A:
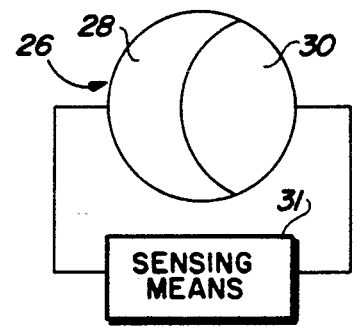
FIG. 3a shows a specific embodiment of the split photodetector 26.
Figure 3:
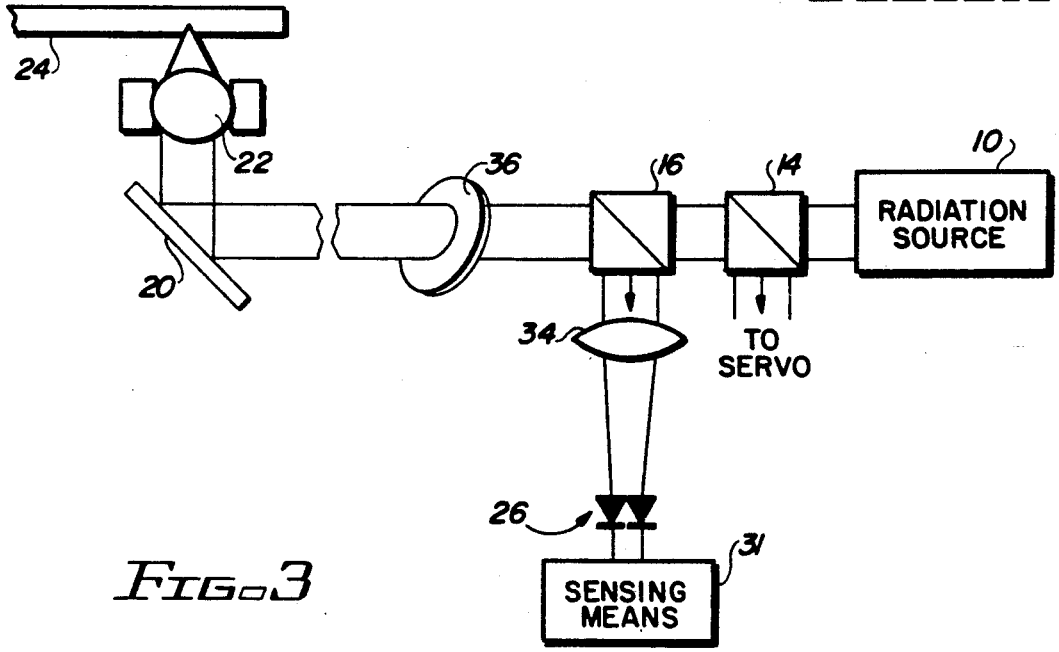
FIG. 3 shows an alternate embodiment of the magneto-optical storage detection system according to the present invention.

An alternate embodiment of the invention is shown in FIG. 3 in which the x component, which is directed into the data detection beam line, is partially focused by a lens 34 and directed into the split photodetector 26. When the split photodetector 26 is placed at or near the focal plane of lens 34, the phase shift required for the local oscillator is zero or quite small. Such a local oscillator can be obtained by replacing the birefringent plate 18 in FIG. 1 with a diattenuating element. A diattenuating element is an optical device with a transmission or attenuation coefficient that depends upon polarization, sometimes termed a partial polarizing element, weak polarizer or dichroic element. One suitable such device is a Brewster plate 36 (FIG. 3) oriented at about 45 degrees with respect to the y axis so that the plane of linearly polarized light is rotated. The light that is reflected from the recording medium then propagates back through the Brewster plate 36, and the x polarized component is picked off by polarization beam splitter 16 and directed into the detection channel. The remaining y polarized light goes back to the servo channel and the laser. The lens 34 then reimages the plane of the medium onto (or very near) the split photodetector 26. Such a re-imaging edge detection channel is distinct from but operates in a manner similar to the far field system in FIG. 1. The line of the split in the photodetector may be straight or curved to best match the shape of the images of the edges of the magnetic domains. An example of photodetectors for a curved line is shown in FIG. 3a.

Figure 4:
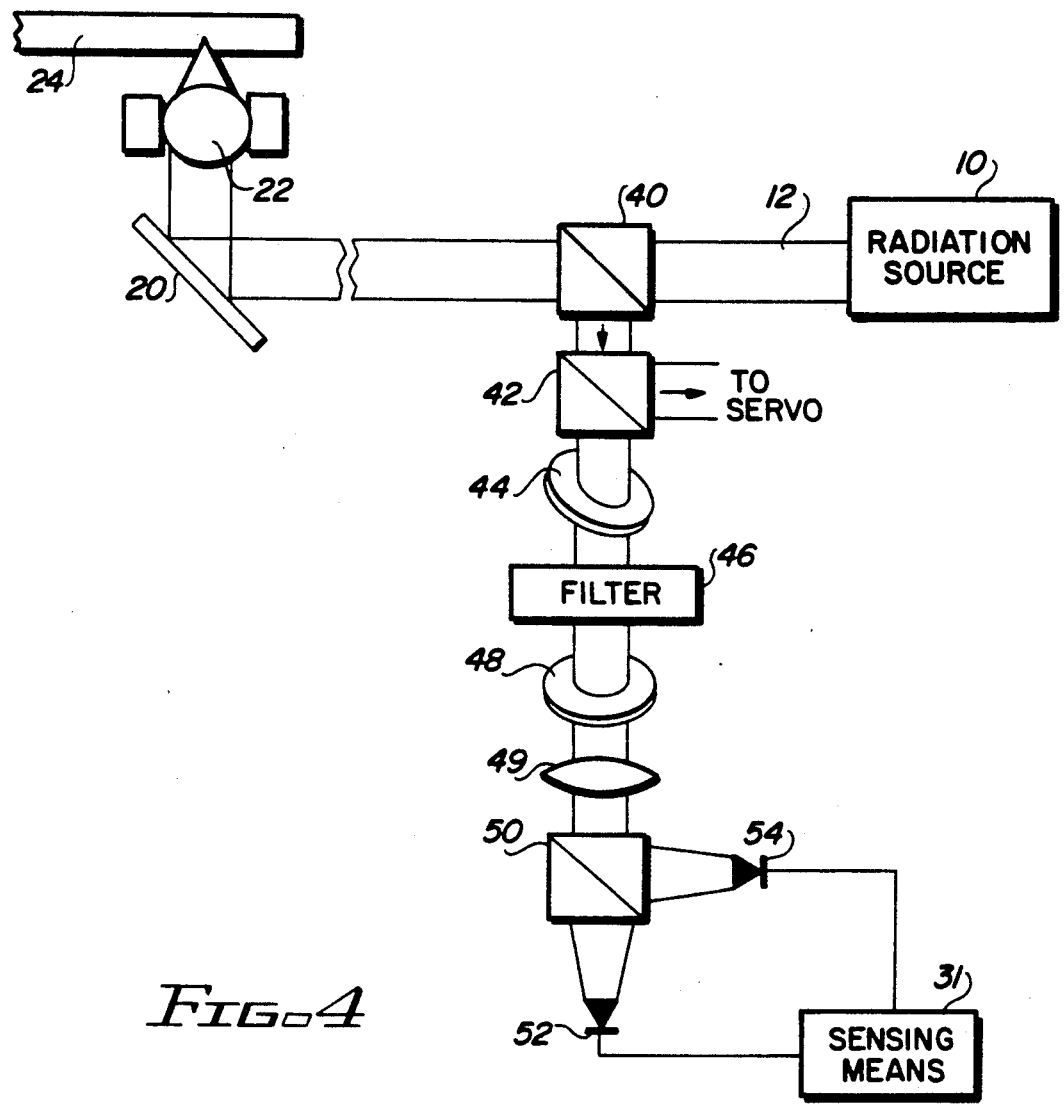
FIG. 4 schematically shows an alternate embodiment of a magneto-optical storage detection system.

An alternate embodiment of a detector system for magneto-optical storage is shown in FIG. 4, and this system comprises a radiation source 10 which produces a collimated beam 12 which is directed through a polarization beam splitter 40 which reflects 100 per cent of the x polarized light along with about 25 percent of the y polarized light. The transmitted light is directed to a selected area of the magneto-optical recording disk 24 by means of turning mirror 20 and objective lens 22. Ideally, there is no phase shift between x and y polarization on reflection from the disk 24, and the reflected light is directed into the data detection beam line by beam splitter 40. The resulting beam is directed to polarization insensitive beam splitter 42 which separates the servo channel from the signal channel. In the signal channel, the light passes through a variable compensator plate 44 which imposes a phase shift between x and y polarizations. A matched filter 46, a half wave plate 48 and a polarization beam splitter 50 then direct beams of equal intensity and orthogonal polarization into two separate photodiodes 52 and 54. Lens 49 merely insures that all light reaches the photodetectors 52 and 54.

Figure 8:
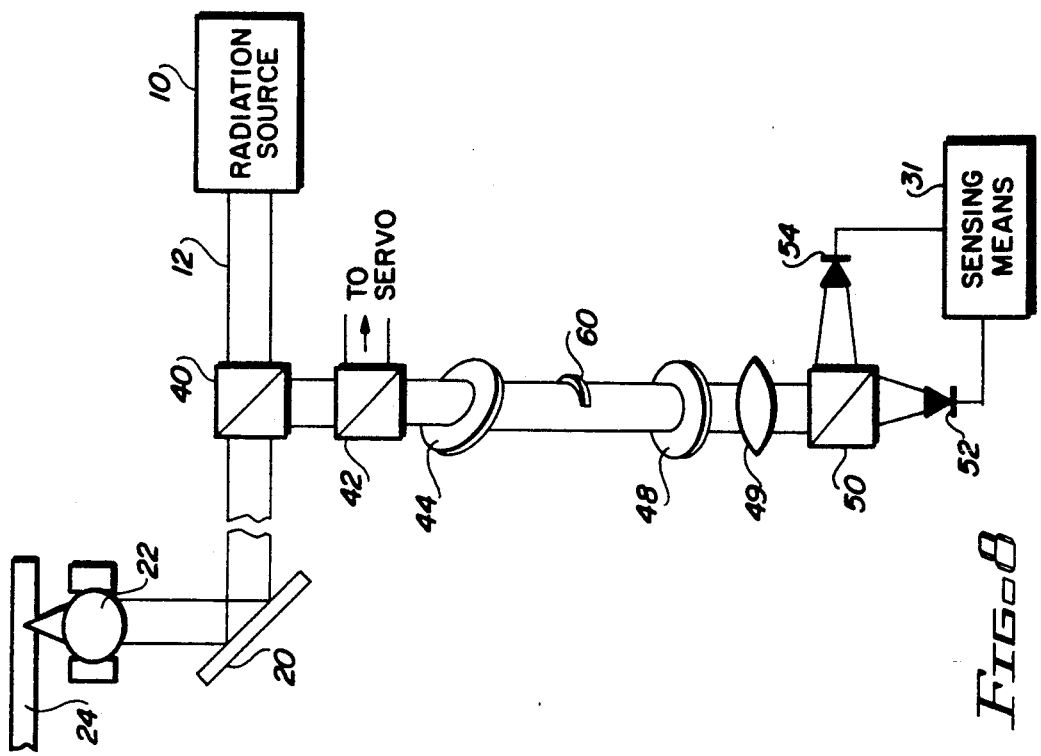
FIG. 8 is a further embodiment of a magneto-optical storage detection system.

The matched filter 46 is designed to direct essentially all the x polarized signal light into one photodetector or another, and differs from previously disclosed optical matched filters by incorporating birefringent optical elements. Another embodiment of the matched filter is shown in FIG. 8. In this embodiment a half of a half wave plate 60 is placed in the path between the variable compensator plate 44 and the half wave plate 48. This embodiment provides a far-field separated detector edge detection system. In this embodiment of the filter the collimated beam returning from the medium and having passed through the compensator plate 44 is affected by the birefringent filter as follows: The optical length of the filter for light polarized in the local oscillator (y) direction is constant across the filter aperture, whereas in the orthogonal (x or signal) polarization the optical length changes by one half wave along a diameter of the filter. When the signal polarization has a uniform sign at the filter plane, this matched filter reverses the sign for half of the beam area. The signal amplitude averaged over the beam area is zero, and the optical powers on the two detectors 52 and 54 are equal. The adjustable half wave plate 48 is oriented to equalize the local oscillator powers at the two detectors. When a transition is centered under the read laser beam, the sign reversal of the signal polarization amplitude due to the difference in Kerr rotations for up and down magnetization is compensated by the reversal due to the filter phase shift. The average polarization of the light exiting the filter is altered, causing an imbalance in the powers reaching the two detectors 52, 54. The resulting electrical signals are similar to those in FIG. 2. Proper operation of this far-field matched filter system requires that the compensator plate 44 be adjusted to impose a 90 degree phase shift between y and x polarized light when the Kerr ellipticity of the medium is zero and the incident read beam is linearly polarized as shown. Other cases require different compensator phase shifts.

Figure 7:
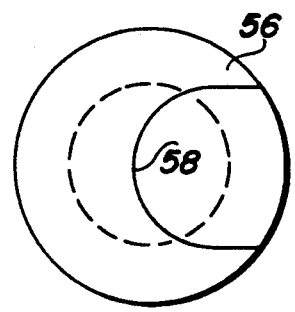
FIG. 7 shows an alternate embodiment of the matched filter of FIG. 4.
Figure 6:
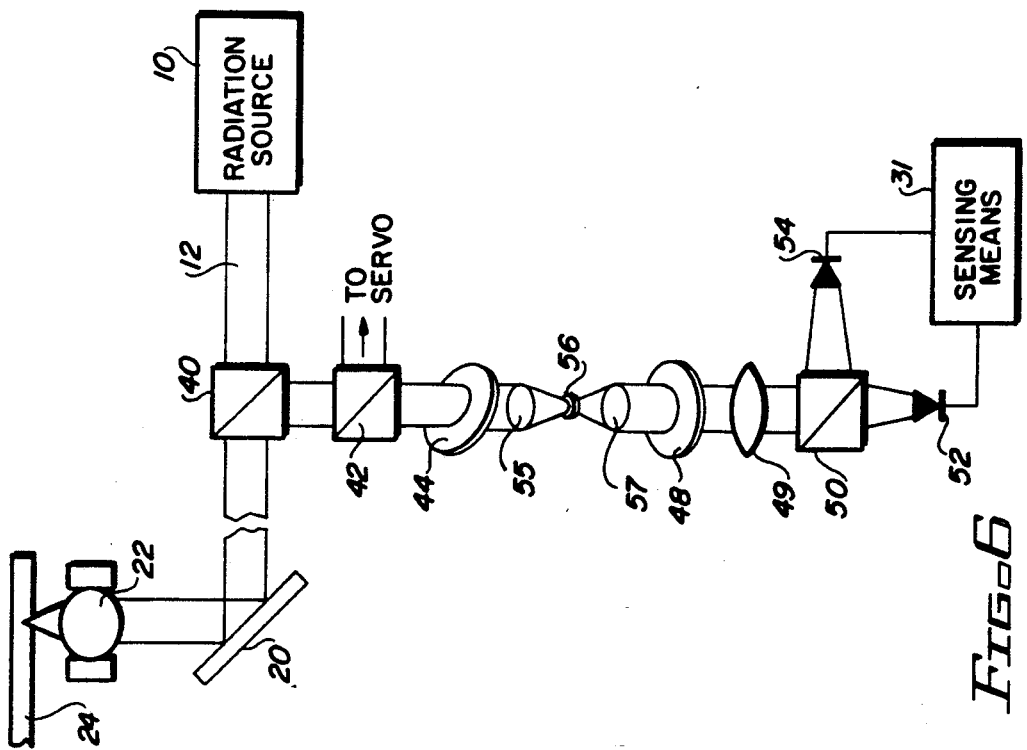
FIG. 6 shows an alternate embodiment of the magneto-optical storage detection system of FIG. 4.

An alternate embodiment of the matched filter is shown in FIG. 6, and in this embodiment a first lens 55 is provided to focus the reflected beam onto a spatially non-uniform birefringent element. A second lens 57 recollimates this beam and directs it through half wave plate 48. In a specific embodiment the spatially nonuniform birefringent element comprises a half wave plate 56 positioned with an edge 58 which matches the edge of the domain as shown in FIG. 7 of the drawing.

Figure 5:
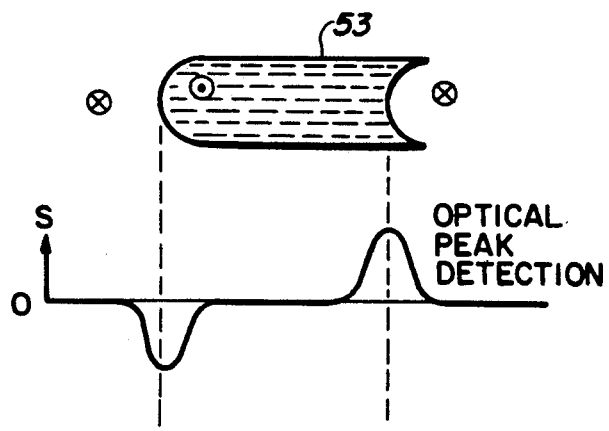
FIG. 5 shows the signal waveform which results from detection of a recorded transition in the system of FIG. 4.

The optical length of the filter for light polarized in the local oscillator direction (y) is constant, whereas in the orthogonal polarization, the optical length changes by one half wave along a straight or curved line which best matches the curved edge of the image of the recorded mark on the recording medium 24. When the signal polarization has a uniform sign across the image, the matched filter reverses the sign for half of the image area. The signal amplitude averaged over the image is zero, and the polarization exiting the filter is the same as the local oscillator polarization. The optical powers on the two detectors 52, 54 are then equal. When a transition is imaged onto the filter 56, the reversal of the signal amplitude due to Kerr-rotation is compensated by the reversal due to the filter phase shift. The polarization of the light exiting the filter is rotated, causing an imbalance in the power at the two detectors 52, 54. The resulting electrical signal is as shown in FIG. 5 which shows a magnetic domain 53 written by direct overwrite. Leading edge signals have opposite sign to trailing edge signals. The widths are narrower than the width of conventionally measured signals because the filter compensates for the curvature of the edges of the domain. No light is lost to apertures since the matched filter 46 alters phase only.

A further embodiment comprises the use of a birefringent hologram or grating system to replace the imaging optics and the matched filter. The hologram would have approximately the same optical transfer function as the filter previously described. Such a hologram can be obtained by superimposing the hologram of a domain boundary in one polarization with that of a uniform track in the other polarization, both as imaged though the objective lens.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magneto-optical storage detection system comprising:
    a radiation source for providing a first radiation beam;
    means for directing said first radiation beam to a storage medium upon which marks are recorded as domains of a first and a second magnetization states;
    means for directing a reflected radiation beam from said recorded medium to a detection channel;
    said detection channel comprising a beam adjustment means, a first and a second optical detector in optical communication with the beam adjustment means, and sensing means connected to the first and second optical detectors, said beam adjustment means for adjusting said reflected radiation beam such that when said first radiation beam is located on a transition between said first and second magnetization states of said medium the amount of radiation of said reflected beam on said first optical detector will be substantially unequal to the amount of radiation of said reflected beam on said second optical detector and the sensing means produces a transition signal, and when said first radiation beam is located on a nontransition area the amount of radiation of said reflected beam on said first optical detector will be approximately equal to the amount of radiation of said reflected beam on said second optical detector.

2. The apparatus of claim 1, wherein said beam adjustment means comprises an optical matched filter in conjunction with a polarization beamsplitter.

3. The apparatus of claim 2, wherein said optical matched filter acts in the far field of said detection system optical components.

4. The apparatus of claim 2, wherein said optical matched filter is a polarization sensitive phase mask wherein one half of said phase mask introduces a 180° degree retardation of one half of said reflected beam with respect to the other half of said reflected beam.

5. The apparatus of claim 2, wherein said optical matched filter comprises a birefringent material.

6. The apparatus of claim 2, wherein said optical matched filter comprises a spatially nonuniform birefringent element.

7. The apparatus of claim 6, wherein said spatially nonuniform birefringent element contains a transition region which matches the average curvature of the images of an edge of said magnetic domains written on said storage medium.

8. The apparatus of claim 2, wherein said optical matched filter comprises a holographic optical element or grating with optical transfer function approximating that of a spatially nonuniform birefringent element.

9. The apparatus of claim 2, wherein the optical matched filter comprises a holographic optical element or grating having an optical transfer function approximating that of a spatially nonuniform birefringent element having a transition region which matches the average curvature of the images of an edge of said magnetic domains written on said storage medium.

10. The apparatus of claim 1, wherein said beam adjustment means comprises a phase compensator plate and a polarization analyzer.

11. The apparatus of claim 1, wherein said beam adjustment means comprises a diattenuating element, a reimaging lens and a polarization analyzer.

12. The apparatus of claim 1, wherein said beam adjustment comprises a reimaging lens and wherein said first and second optical detectors are adjacent and are separated along a line which matches the average curvature of the image of the transitions as reimaged by said lens upon said first and second optical detectors.

13. A magneto-optical storage detection system comprising:
    a radiation source for providing a first radiation beam;
    a storage medium upon which marks are recorded as domains of a first and a second magnetization states;
    means for directing said first radiation beam to said storage medium;
    means for directing a reflected radiation beam from said storage medium to a detection channel;
    said detection channel comprising a beam adjustment means, a first and a second optical detector in optical communication with the beam adjustment means, and sensing means connected to the first and second optical detectors, the beam adjustment means for adjusting said reflected radiation beam such that when said first radiation beam is located on a transition between said first and second magnetization states of said medium the amount of radiation of said reflected beam on said first optical detector will be substantially unequal to the amount of radiation of said reflected beam on said second optical detector and the sensing means produces a transition signal, and when said first radiation beam is located on a nontransition area the amount of radiation of said reflected beam on said first optical detector will be approximately equal to the amount of radiation of said reflected beam on said second optical detector.

14. The apparatus of claim 13, wherein said beam adjustment means comprises an optical matched filter in conjunction with a polarization beamsplitter.

15. The apparatus of claim 14, wherein said optical matched filter acts in the far field of said detection system optical components.

16. The apparatus of claim 14, wherein said optical matched filter is a polarization sensitive phase mask wherein one half of said phase mask introduces a 180° degree retardation of one half of said reflected beam with respect to the other half of said reflected beam.

17. The apparatus of claim 14, wherein said optical matched filter comprises a birefringent material.

18. The apparatus of claim 14, wherein said optical matched filter comprises a spatially nonuniform birefringent element.

19. The apparatus of claim 18, wherein said spatially nonuniform birefringent element contains a transition region which matches the average curvature of the images of an edge of said magnetic domains written on said storage medium.

20. The apparatus of claim 14, wherein said optical matched filter comprises a holographic optical element or grating with optical transfer function approximating that of a spatially nonuniform birefringent element.

21. The apparatus of claim 14, wherein the optical matched filter comprises a holographic element or grating having an optical transfer function approximating that of a spatially nonuniform birefringent element having a transition region which matches the average curvature of the images of an edge of said magnetic domains written on said storage medium.

22. The apparatus of claim 13, wherein said beam adjustment means comprises a phase compensator plate and a polarization analyzer.

23. The apparatus of claim 13, wherein said beam adjustment means comprises a diattenuating element, a reimaging lens, and a polarization analyzer.

24. The apparatus of claim 13, wherein said beam adjustment means comprises a reimaging lens and wherein said first and second optical detectors are adjacent and are separated along a line which matches the average curvature of the image of the transitions as reimaged by said lens upon said first and second optical detectors.

* * * * *